(12) United States Patent
Mehrkens et al.

(10) Patent No.: US 7,128,181 B2
(45) Date of Patent: Oct. 31, 2006

(54) SEAT CONSOLE FOR A VEHICLE SEAT

(75) Inventors: Michael Mehrkens, Koenigsbach-Stein (DE); Siegfried Walter, Leonberg (DE); Steffen Meier, Freudental (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 278 days.

(21) Appl. No.: 10/727,991

(22) Filed: Dec. 5, 2003

(65) Prior Publication Data

US 2004/0164581 A1 Aug. 26, 2004

(30) Foreign Application Priority Data

Dec. 5, 2002 (DE) .............................. 102 56 741

(51) Int. Cl.
*B60R 21/015* (2006.01)
*G01G 19/08* (2006.01)
(52) U.S. Cl. ....................... 180/273; 177/144; 280/735
(58) Field of Classification Search ................ 177/144; 180/273; 280/735
See application file for complete search history.

(56) References Cited

U.S. PATENT DOCUMENTS

| | | | | |
|---|---|---|---|---|
| 5,039,344 A | * | 8/1991 | Bodis et al. ................ 106/641 |
| 5,991,676 A | * | 11/1999 | Podoloff et al. ............... 701/45 |
| 6,282,473 B1 | | 8/2001 | Steffens, Jr. .................. 701/45 |
| 6,323,443 B1 | * | 11/2001 | Aoki et al. ................... 177/144 |
| 6,419,315 B1 | | 7/2002 | Hiemstra .................. 297/216.1 |
| 6,494,482 B1 | * | 12/2002 | Curtis ......................... 280/735 |
| 6,670,560 B1 | * | 12/2003 | Curtis ......................... 177/144 |
| 6,835,899 B1 | * | 12/2004 | Wolfe et al. ................. 177/144 |
| 2002/0062699 A1 | | 5/2002 | Kimura ....................... 73/795 |

FOREIGN PATENT DOCUMENTS

| | | |
|---|---|---|
| DE | 199 25 877 | 1/2000 |
| DE | 100 60 649.0 | 8/2001 |
| DE | 698 02 109 | 6/2002 |
| DE | 101 54 231 | 8/2002 |

* cited by examiner

*Primary Examiner*—Randy W. Gibson
(74) *Attorney, Agent, or Firm*—Crowell & Moring LLP

(57) ABSTRACT

In a seat console, weight sensors for measuring the weight of occupants are arranged, which are provided between a top frame and a bottom frame of the console. So that a floating bearing of the top frame in the bottom frame is ensured, the top frame and the bottom frame are held to be supported by the weight sensors. In order to avoid damage or a faulty measurement, the top frame dips into the bottom frame in an open manner.

6 Claims, 3 Drawing Sheets

SEAT CONSOLE FOR A VEHICLE SEAT

BACKGROUND AND SUMMARY OF THE INVENTION

This application claims the priority of German Application No. 102 56 741.7 filed Dec. 5, 2002, the disclosure of which is expressly incorporated by reference herein.

The invention relates to a seat console, for a vehicle seat held on the vehicle floor, which is connected with a seat rail in which the vehicle seat is slidably disposed.

From German Patent Document DE 698 02 109 T 2, a system is known for determining the weight of a vehicle occupant, in which weight sensors are arranged between a seat rail and a seat frame. The arrangement of forward and rearward weight sensors in vehicle seats is known from German Patent Document DE 100 60 649 A1 (corresponding U.S. Pat. No. 6,282,473).

It is an object of the invention to provide a seat console for a vehicle seat which is easy to mount, has a casing for the weight sensors and ensures a disturbance-free weight measurement of a vehicle occupant.

According to the invention, this object is achieved by providing a seat console, for a vehicle seat held on the vehicle floor, which is connected with a seat rail in which the vehicle seat is slidably disposed, wherein the seat console comprises a stationary bottom frame with a floatingly disposed top frame while weight sensors are connected in-between, the weight sensors being connected by way of connection elements, in a stationary manner with the top frame on the one hand and being fastened to the bottom frame by way of a bolt integrated in the respective sensors on the other hand. Additional advantageous characteristics of the invention are described herein and in the claims.

Important advantages achieved by means of certain preferred embodiments of the invention are that the seat console is constructed to essentially consist of a top frame and a bottom frame in a torsion-resistant manner with the sensors disposed in-between. For this purpose, the seat console comprises a stationary bottom frame with a floatingly disposed top frame with the weight sensors connected in-between. By way of connection elements, the weight sensors are, on the one hand, stationarily fastened to the top frame and, on the other hand, by way of a bolt integrated in the respective sensor, fastened to the bottom frame.

In certain preferred embodiments of the invention, the top frame and the bottom frame each have a U-profile-shaped cross-section, the top frame dipping into the bottom frame, and the sensors each being surrounded by the lateral profile side walls of the top and bottom frame. The top and bottom frame each have a U-profile-shaped construction, in which case, by means of its side walls, the top frame reaches in a floating manner from the outside over the side walls of the bottom frame. By means of this U-profile-shaped construction of the two frames of the seat console, the intermediately disposed weight sensors can emit a disturbance-free signal which is analyzed by way of an electric control.

So that the signal unambiguously determines the weight of the seat user, it is further provided according to certain preferred embodiments of the invention that the bottom frame and the top frame have a U-profile shape which, on its free leg ends, in each case, has a sensor, and the other sensors are arranged in the transition area of the legs of the U-profile shape to the transverse web. By means of this arrangement of the sensors, the total weight applied to a vehicle seat has to be determined in an optimal manner. According to another embodiment, the bottom frame and the top frame can have a closed U-profile shape; that is, at the free end, the legs are each connected with a transverse web.

According to certain preferred embodiments of the invention, for achieving a parallel arrangement of the top frame with respect to the bottom frame, so-called spacer blocks are arranged between the sensors and the top frame, which spacer blocks have to purpose of eliminating possible differences. These spacer blocks are, for example, in different thicknesses, adapted to the respective situation, so that no faulty measurement of the occupant's total weight determined by way of the four sensors can take place.

According to certain preferred embodiments of the invention, it is also provided that the sensors arranged in the legs can be screwed to the top frame by way of two threaded bolts in a threaded plate arranged on the top side of the top frame. By means of this connection of the sensors with the top frame, a simple preassembly of the sensors can take place, and a firm fit is achieved on this top frame.

The other sensors arranged in the transition area can be fastened, for example, by means of a threaded bolt in nuts stationarily held in the top frame according to certain preferred embodiments of the invention. As a result of the fixing in the wall of the top frame, these nuts require a height which is lower in comparison to a fitted-on threaded plate.

According to certain preferred embodiments of the invention, as a result of the construction of the seat console with mutually closing-off profiles, objects in the vehicle can neither block the measuring path of the weight sensors, nor hinder the floating bearing of the top frame with respect to the bottom frame. In addition, the sensor system is protected. Measuring errors are minimized by the direct screw-on points of the sensors on the frame of the seat console. The U-shape of the top and bottom frame is advantageous because a leg room can be retained in the rear area of the vehicle.

Other objects, advantages and novel features of the present invention will become apparent from the following detailed description of the invention when considered in conjunction with the accompanying drawings.

DETAILED DESCRIPTION OF THE DRAWINGS

A seat console 1 for a vehicle comprises a bottom frame 2 fixedly connected with the vehicle in use, and a top frame 3. Several weight sensors 4 to 7 are arranged between the bottom frame and the top frame 2, 3. These weight sensors are fixedly connected with the top frame 3 and are held on the bottom frame 2.

Figure 2:
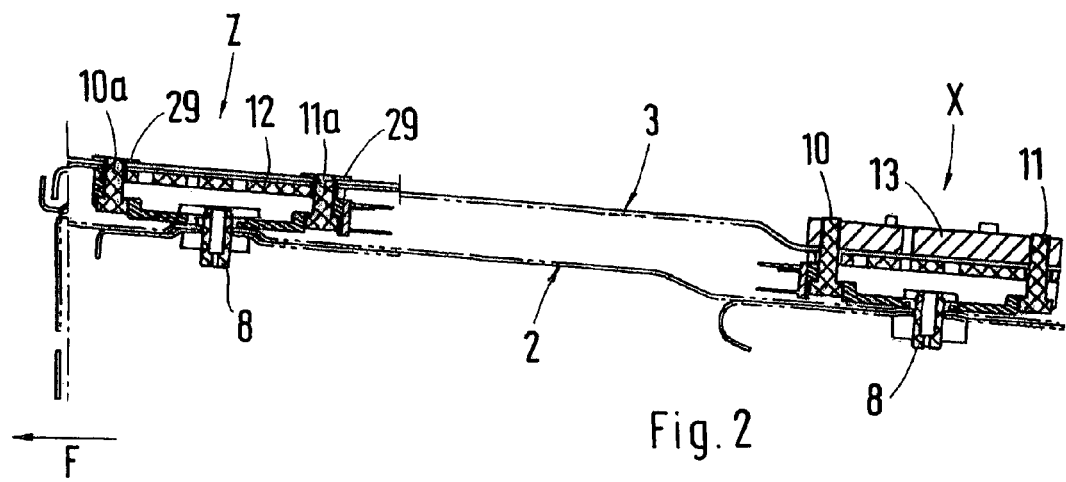
FIG. 2 is a vertical sectional view of the legs of the top and bottom frame of FIG. 1, shown in the assembled condition.
Figure 4:
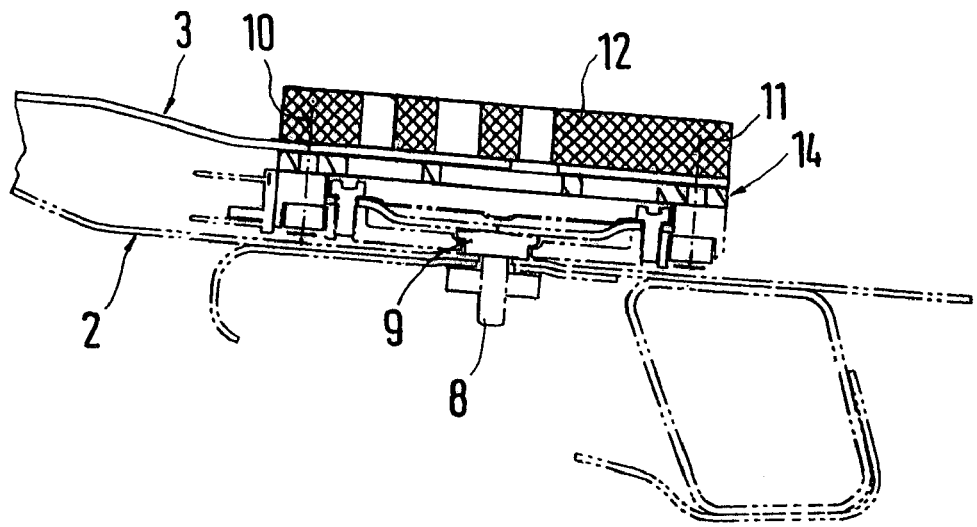
FIG. 4 is a vertical sectional view of the detail X of the sensor between the frame legs situated in the rear with respect to the driving direction F.
Figure 5:
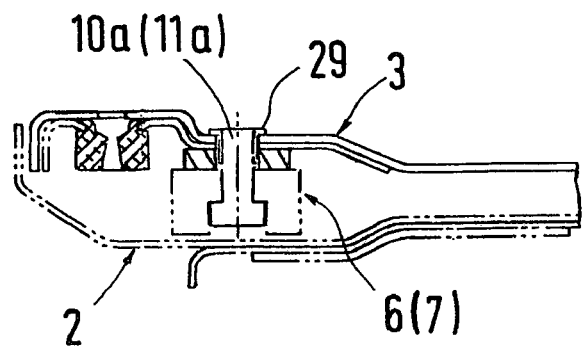
FIG. 5 is a vertical sectional view of the detail Z of the sensor situated in the front with respect to the driving direction in the transition area from the leg to the transverse web of the frames.

For determining the weight of an occupant sitting in the vehicle seat, the top frame 3 is floatingly arranged on the bottom frame 2 while the weight sensors 4 to 7 are connected in-between. For this purpose, the sensors 4 to 7 are supported by way of a bolt 8 on the bottom frame 2 which acts by means of its head 9 upon a measuring element in the sensor. By way of two spaced threaded bolts 10, 11 and 10*a*, 11*a* respectively, the sensors 4 to 7 are fixed by means of a threaded plate 12, 13 on the top frame 3, which is illustrated in detail in FIG. 2 and in details X and Z of FIGS. 4 and 5. So that a compensation for a parallel arrangement of the top frame 3 with respect to the bottom frame becomes possible, so-called spacer blocks 14, 15 of a different thickness may be arranged between the sensors 4 to 7.

Figure 3:
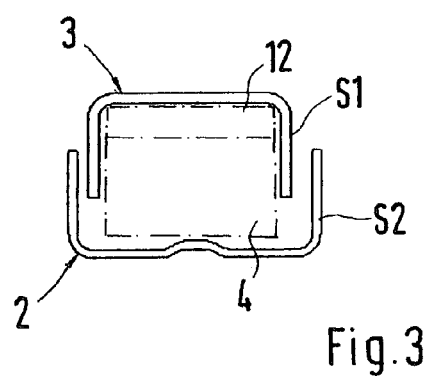
FIG. 3 is a cross-sectional view of the U-profiles of the top and bottom frame of FIGS. 1 and 2, shown in the assembled condition.

The bottom frame 2 as well as the top frame 3 have a U-profile-shaped cross-section, as illustrated in detail in FIG. 3, and the lateral profile side walls S1, S2 of the two frames 2 and 3 overlap one another, the side walls S1 of the top frame 3 being situated in a slightly spaced manner within the side walls S2 of the bottom frame 2. According to another embodiment, the side walls S1 can also reach over the side walls S2 from the outside.

The top frame and the bottom frame 3, 2 form a U-shape, in which case, the transverse web 20, 21 is situated in the front with respect to the driving direction F, and the adjoining legs 22, 23 of the frame 2, 3 extends from this transverse frame toward the rear against the driving direction F. The weight sensors 4, 5 are arranged at the free ends 24, 25 between the legs 22, 23 of the U-shape of the frames 3, 2. The other weight sensors 6, 7 are provided in the transition area 26, 27 between the frames 2 and 3.

The fastening of the sensors 4, 5 takes place on the top frame 3 by means of the screws 10, 11 and 10*a*, 11*a* respectively, which are screwed to the threaded plate 12. The other sensors 6, 7 are held either by way of a threaded plate 13 or by way of nuts 29 inserted into the frame 3. In the embodiment shown, the sensor 6 is held by means of a threaded plate 13, and the sensor 7 is held by means of threaded nuts 29.

Figure 1:
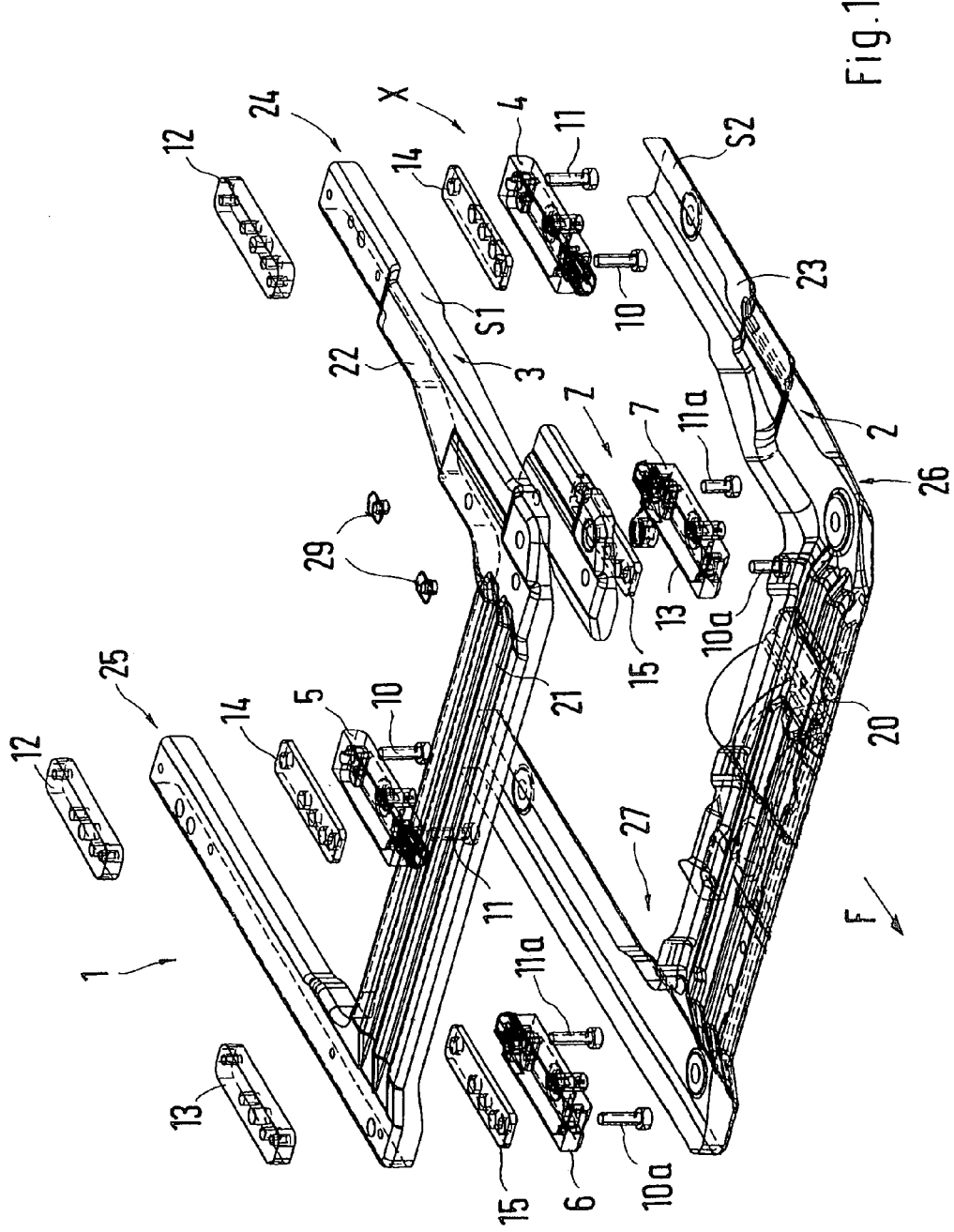
FIG. 1 is a diagrammatic representation of seat console in an exploded view of the frames, sensors and fastening elements, constructed according to a preferred embodiment of the invention.

FIG. 1 is a detailed view of only the seat console 1 with the top frame and bottom frame 3, 2. A seat rail, which is not shown, is connected with the top frame 3, on which seat rail a vehicle seat is arranged in a slidable manner. The seat console 1 should have an arrangement for the sensors 4 to 7 which is as protected as possible. As illustrated in FIG. 3 in detail, for this purpose, the U-profiles of the legs 22, 23 of the frames 2, 3 are nested in one another, so that the floating arrangement of the top frame 3 in the bottom frame 2 is not hindered. Furthermore, the free ends 24, 25 of the frames 2, 3 are closed off by means of a cap or the like which is not shown in detail.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Seat console, for a vehicle seat held on the vehicle floor, which is connected with a seat rail in which the vehicle seat is slidably disposed, the seat console comprising a stationary bottom frame with a floatingly disposed top frame with weight sensors connected therebetween, the weight sensor being stationarily connected by way of connection elements, with the top frame, and being fastened to the bottom frame by way of a bolt integrated in the respective sensors, wherein the top frame and the bottom frame each have a U-profile-shaped cross-section and side walls, the top frame reaching by the side walls thereof in a floating manner over the side walls of the bottom frame, the side walls of the top frame dipping into the bottom frame and the weight sensors each being surrounded by the side walls of the top frame and the bottom frame, the weight sensors being arranged such that the frames each have a sensor and other of the weight sensors are arranged in a transition area of the legs to a transverse web of the frames, and spacer blocks are arranged between the sensors and the top frame to form a parallel arrangement of the top and bottom frames.

2. Seat console according to claim 1, wherein the sensors arranged in the legs are configured to be screwed to the top frame by two threaded bolts and respectively in the threaded plate constructed as a connection element on the top side of the top frame.

3. Seat console according to claim 1, wherein the sensors arranged in the transition area and respectively can be fastened by means of threaded bolts in nuts stationarily held in the top frame or the threaded plate.

4. Seat console according to claim 1, wherein the legs of the top frame and the bottom frame are closed off at their free ends by way of a cap.

5. Seat console according to claim 1, wherein the bottom frame and the top frame are comprised of a U-shape, and free ends of legs of the U-shape frames are each connected by way of a transverse web.

6. A passenger vehicle seat console assembly for supporting a vehicle seat rail which in use slidably supports a vehicle seat, said console assembly comprising:
   a bottom frame;
   a top frame; and
   a plurality of weight sensors disposed between the top and bottom frames,
   wherein the respective weight sensors are connected in a stationary manner with the top frame and are fastened to the bottom frame by respective bolts integrated in the respective weight sensors, the top frame and the bottom frame each have a U-profile-shaped cross-section and side walls, the top frame reaching by the side walls thereof in a floating manner over the side walls of the bottom frame, the side walls of the top frame dipping into the bottom frame and the weight sensors each being surrounded by the side walls of the top frame and bottom frame, the weight sensor being arranged such that the frames each have a sensor and other of the weight sensors are arranged in a transition area of the legs to a transverse web of the frames, and spacer blocks are arranged between the sensors and the top frame to form a parallel arrangement of the top frame with respect to the bottom frame.

* * * * *